(12) United States Patent
Shao et al.

(10) Patent No.: US 7,776,430 B2
(45) Date of Patent: *Aug. 17, 2010

(54) CARBON FOAM TOOLING WITH DURABLE SKIN

(75) Inventors: Richard L. Shao, North Royalton, OH (US); David M. Kaschak, Olmsted Falls, OH (US)

(73) Assignee: GrafTech International Holdings Inc., Parma, OH (US)

( * ) Notice: Subject to any disclaimer, the term of this patent is extended or adjusted under 35 U.S.C. 154(b) by 494 days.

This patent is subject to a terminal disclaimer.

(21) Appl. No.: 11/762,045

(22) Filed: Jun. 12, 2007

(65) Prior Publication Data

US 2008/0145642 A1 Jun. 19, 2008

Related U.S. Application Data

(63) Continuation-in-part of application No. 11/137,111, filed on May 25, 2005, now Pat. No. 7,232,606, and a continuation-in-part of application No. 10/970,352, filed on Oct. 21, 2004, now Pat. No. 7,527,855.

(51) Int. Cl.
B32B 3/26 (2006.01)

(52) U.S. Cl. ............ 428/315.7; 428/319.1; 428/319.3; 428/319.7; 428/355 R; 428/315.5

(58) Field of Classification Search ............ 428/319.1, 428/319.3, 319.7, 319.9, 355 R, 315.5, 315.7
See application file for complete search history.

(56) References Cited

U.S. PATENT DOCUMENTS

| | | | |
|---|---|---|---|
| 3,302,399 A | 2/1967 | Tini et al. ............ 60/39.7 |
| 3,302,909 A | 2/1967 | Glassman ............ 248/44 |
| 3,309,437 A | 3/1967 | Harnett ............ 264/29 |
| 3,387,940 A | 6/1968 | McHenry et al. ............ 23/209.2 |
| 3,441,529 A | 4/1969 | Tyler ............ 260/19 |
| 3,632,385 A | 1/1972 | Schmitt et al. ............ 117/46 |
| RE28,574 E | 10/1975 | Ruoff ............ 425/78 |
| 3,960,761 A | 6/1976 | Burger et al. ............ 252/421 |
| 4,190,637 A | 2/1980 | Kennedy ............ 423/448 |
| 4,619,796 A | 10/1986 | Awata et al. ............ 264/29.4 |
| 4,681,718 A | 7/1987 | Oldham ............ 264/102 |
| 4,816,511 A | 3/1989 | Castonguay et al. ............ 524/496 |
| 4,851,280 A | 7/1989 | Gupta ............ 428/246 |
| 4,879,182 A | 11/1989 | Presswood et al. ............ 428/408 |
| 4,992,254 A | 2/1991 | Kong ............ 423/449 |
| 5,002,981 A | 3/1991 | Chiu ............ 523/141 |
| 5,047,225 A | 9/1991 | Kong ............ 423/447.2 |
| 5,211,786 A | 5/1993 | Enloe et al. ............ 156/89 |
| 5,280,063 A | 1/1994 | Lewis et al. ............ 524/594 |
| 5,282,734 A | 2/1994 | Pastureau et al. ............ 425/393 |
| 5,358,802 A | 10/1994 | Mayer et al. ............ 429/218 |
| 5,648,027 A | 7/1997 | Tajiri et al. ............ 264/43 |
| 5,686,038 A | 11/1997 | Christensen et al. ............ 264/257 |
| 5,709,893 A | 1/1998 | McCarville et al. ............ 425/389 |
| 5,730,915 A | 3/1998 | Cornie ............ 264/29.1 |
| 5,868,974 A | 2/1999 | Kearns ............ 264/29.6 |
| 5,888,469 A | 3/1999 | Stiller et al. ............ 423/445 |
| 5,937,932 A | 8/1999 | Cornie ............ 164/526 |
| 5,945,084 A | 8/1999 | Droege ............ 423/447.4 |
| 5,961,814 A | 10/1999 | Kearns ............ 208/39 |
| 5,984,256 A | 11/1999 | Endo ............ 249/114.1 |
| 6,024,555 A | 2/2000 | Goodridge et al. ............ 425/394 |
| 6,033,506 A | 3/2000 | Klett ............ 156/78 |
| 6,093,245 A | 7/2000 | Hammond et al. ............ 117/200 |
| 6,099,792 A | 8/2000 | Ganguli et al. ............ 264/621 |
| 6,103,149 A | 8/2000 | Stankiewicz ............ 264/29.1 |
| 6,183,854 B1 | 2/2001 | Stiller et al. ............ 428/312.2 |
| 6,214,158 B1 | 4/2001 | Chiu et al. ............ 156/314 |
| 6,217,800 B1 | 4/2001 | Hayward ............ 264/29.1 |
| 6,241,957 B1 | 6/2001 | Stiller et al. ............ 423/448 |
| 6,323,160 B1 | 11/2001 | Murdie et al. ............ 508/109 |
| 6,344,159 B1 | 2/2002 | Klett ............ 264/29.7 |
| 6,346,226 B1 | 2/2002 | Stiller et al. ............ 423/448 |
| 6,387,343 B1 | 5/2002 | Klett ............ 423/448 |
| 6,399,149 B1 | 6/2002 | Klett et al. ............ 427/230 |
| 6,506,354 B1 | 1/2003 | Stiller et al. ............ 423/445 |
| 6,576,168 B2 | 6/2003 | Hardcastle et al. ............ 264/29.1 |
| 6,656,238 B1 | 12/2003 | Rogers et al. ............ 44/620 |
| 6,672,125 B2 * | 1/2004 | Kenney et al. ............ 72/296 |
| 6,776,936 B2 | 8/2004 | Hardcastle et al. ............ 264/29.1 |
| 6,849,098 B1 | 2/2005 | Joseph et al. ............ 44/620 |
| 7,232,606 B2 * | 6/2007 | Shao et al. ............ 428/317.3 |

(Continued)

OTHER PUBLICATIONS

GB Patent Specification 1,489,690, Application No. 28255/75, filed Jul. 4, 1975 titled "Briquetting Coal".

(Continued)

*Primary Examiner*—Hai Vo
(74) *Attorney, Agent, or Firm*—Waddey & Patterson, P.C.; James R. Cartiglia

(57) ABSTRACT

An article for tooling composite materials, including a carbon foam, a sealant attached to the carbon foam so as to form a monolithic fine-grain graphite-like surface; and a skin of facesheet materials. The facesheet materials include: a spray-deposited coating of metal; more preferably, a thermal or plasma spray-deposited metal; and most preferably, a plasma sprayed Invar metal. The facesheet materials may optionally include a flash coating. The facesheet materials alternately include plastics, resinous materials and carbon-carbon composite materials.

11 Claims, No Drawings

U.S. PATENT DOCUMENTS

| | | | |
|---|---|---|---|
| 7,527,855 B2 * | 5/2009 | Miller et al. | 428/304.4 |
| 7,563,841 B2 * | 7/2009 | Shao et al. | 524/496 |
| 2002/0190414 A1 | 12/2002 | Hardcastle et al. | |
| 2005/0008862 A1 | 1/2005 | Joseph et al. | |
| 2006/0014908 A1 | 1/2006 | Rotermund et al. | |
| 2006/0086043 A1 * | 4/2006 | Miller et al. | 44/607 |
| 2006/0159905 A1 * | 7/2006 | Shao et al. | 428/304.4 |
| 2006/0240241 A1 | 10/2006 | Chang et al. | |

OTHER PUBLICATIONS

WO 2006/076556, publication date Jul. 20, 2006.

"A Novel Carbon Fiber Based Porous Carbon Monolith" by T.D. Burchell, J.W. Klett, and C.E. Weaver, Proceedings of the Ninth Annual Conference on Fossil Energy Materials, Oak Ridge, TN, May 16-18, 1995.

Kirk-Othmer, Encyclopedia of Chemical Technology, 4$^{th}$ ed., vol. 6, John Wiley & Sons, Application of Coal Petrology and Petrography, pp. 429-434 and 454-455, 1993.

POCO Graphite Foam, Properties and Characteristics, Jun. 29, 2001.

High-Performance Composites, Sep. 2004, p. 25.

Modifications of Phenolic Precursor Carbon Foam, R.A. Mercuri and J.M. Criscione, Fuel Division of American Chemical Society, 156th Annual Meeting, Proceedings of 9th Carbon Conference, Jun. 16-20, 1969, pp. 206 and 207.

High Thermal Conductivity, Mesophase Pitch-Derived Carbon Foam, 43rd International SAMPE Symposium, May 31-Jun. 4, 1998, pp. 745, 746.

Microcellular Pitch-Based Carbon Foams Blown with Helium Gas, Anderson, et al., 43rd International SAMPE Symposium, May 31-Jun. 4, 1998, pp. 756, 758, and 760.

GB-263—Advanced Structural Carbons: Fibers, Foams and Composites, pp. 43-51.

Aztex X-Cor, High Performance, Damage Tolerant Composite Core Material, Oct. 2002.

Polyurethane-infiltrated carbon foams: A coupling of thermal and mechanical properties, 2003, vol. 87, pp. 2348-2355, Journal of Applied Polymer Science, Timothy J. Bunning, et al. (Abstract only).

Chemistry and Physics of Carbon, vol. 1, 1965, Marcel Dekker, Inc., New York, pp. 327-365.

Chemistry and Physics of Carbon, vol. 4, 1968, Marcel Dekker, Inc., New York, pp. 286-383.

Chemistry and Physics of Carbon, vol. 7, 1971, Marcel Dekker, Inc., New York, pp. 82-105.

* cited by examiner

CARBON FOAM TOOLING WITH DURABLE SKIN

RELATED APPLICATIONS

This application is a continuation-in-part of and claims priority to and commonly assigned U.S. patent application Ser. No. 11/137,111, filed May 25, 2005, now U.S. Pat. No. 7,232,606 and entitled "Sealant for High Strength Carbon Foam" and is a continuation-in-part of and claims priority to and commonly assigned U.S. patent application Ser. No. 10/970,352, filed Oct. 21, 2004, now U.S. Pat. No. 7,527,855 and entitled "High Strength Monolithic Carbon Foam," the disclosures of which are incorporated herein by reference.

BACKGROUND OF THE INVENTION

1. Technical Field

The present invention relates to clad carbon foam tooling articles useful in fabricating composite materials. More particularly, the present invention relates to tooling articles comprising high strength carbon foam blocks clad with durable facesheet materials. Even more particularly, the present invention relates to tooling articles comprising high strength, monolithic carbon foam blocks sealed with cured carbonaceous cements and clad with thermally compatible durable facesheet materials and further relates to processes and materials for forming such articles.

2. Background Art

High strength, light weight carbon materials have been suggested in the prior art as useful for tooling articles. In particular, carbon foams have attracted considerable recent activity because of their low density, coupled with either very high or low thermal conductivity. Unfortunately, carbon foams produced by the prior art processes are not adequate for many high temperature applications such as composite tooling. These foams generally are not monolithic and fail to meet the strength and strength to density requirements for such applications. In addition, open-celled carbon foams with highly interconnected pores have porosities making them unsuitable for such applications. The terms pore and cell are used interchangeably to refer to the small cavities in the foam formed by gaseous displacement in its precursor material.

Cladding of carbon foams has also been suggested in the prior art as an adaptation for improving their usefulness as tooling articles. In their U.S. Pat. No. 6,849,098, Joseph and Rogers describe the carbon foam products having highly interconnected, open-celled pore structures clad with so-called 'facesheet' materials. Herein, the term 'facesheet' refers to a skin, cladding or outer layer of an article, especially a tooling article, that has a working face or working surface. The facesheet materials applied to carbon foams according to the process described by Joseph and Rogers either completely or partially fill the cell volumes. However, filling cells with facesheet materials will increase the density of such foams and consequently reduce their suitability as a lightweight material for use in composite tooling. Facesheet clad carbon foams created by the Joseph and Rogers process exhibit inherent structural problems, including difficulties in adhering the facesheet materials directly to the carbon foam and internal stressing and cracking of facesheet materials caused by incompatible rates of thermal expansion. The Joseph and Rogers foam products likely do not have the required strength to density ratios needed for tooling or other structural applications. Also, the foams produced in accordance with the Joseph and Rogers techniques are not available in sufficiently large blocks for tooling, thus requiring several blocks to be cemented together. While such blocks may be successfully cemented together, more cemented joints necessarily reduces the structural integrity of the resulting block and can lead to seams in the finished product.

Recently, a carbon foam has been developed and commercialized under the trademark GRAFOAM by UCAR Carbon Company Inc. of Parma, Ohio and described in U.S. Patent Application Publication No. US 2006-0086043 A1 to which the present application claims priority. This novel foam is monolithic and has a controllable cell structure providing a cell structure, strength and strength to density ratios suitable for composite tooling and other applications. Indeed, a combination of characteristics found in GRAFOAM carbon foam, including strength to density ratios higher than demonstrated in the prior art, have been found to be necessary for use of a carbon foam in composite tooling applications.

While GRAFOAM carbon foam has a pore structure which provide low gas permeability in comparison to the open-cell carbon foams available in the market, its carbon foam surface is still porous and requires sealing in order to make the carbon foam especially useful for applications such as tooling. If the foam surface is not adequately sealed, resin can infiltrate the foam block during composite manufacturing processes such as resin infusion and vacuum assisted resin transfer molding. The novel carbon foam has a density of about 0.05 to about 0.8 grams per cubic centimeter ($g/cm^3$), with a compressive strength of at least about 2000 pounds per square inch (psi) (measured by, for instance, ASTM C695) for composite tooling materials; core material is lower density material. The novel carbon foam, when intended for use in high temperature applications such as composite tooling, is formed so as to provide a ratio of strength to density of at least about 7000 $psi/(g/cm^3)$.

The novel carbon foam has a cell structure with low interconnectivity. Two distinct pore size distributions greatly improve the suitability of this novel carbon foam for composite tooling applications. One pore size is in the micron range; the other in the tens to hundreds of microns range. However, conventional commercial sealers cannot seal the pores to the extent desired. Low-viscosity commercial sealers simply wick into the foam and cannot seal the surface even after many applications. High-viscosity commercial sealers/adhesives, such as those commercially available as Loctite 9394 and 9396, form sealant skins on the foam surface; such skins shrink and crack during curing, resulting in delamination of the sealant from the foam.

Cement sealants for sealing monolithic graphite or other "solid" carbon block are known in the prior art. Previously disclosed carbonaceous cements include cement paste compositions having finely divided solid carbonaceous particles, such as graphite flour, coke flour, carbon black, pitch coke flour and calcined lampblack flour, that are present at from about 20% to about 85% by weight. Such prior art cements may also include a resin binder system, a solvent and a catalyst. Although effective as cements, there is no disclosure in the prior art of the use of carbonaceous cements to either seal porous carbon foams or bond together blocks of porous carbon foams, especially those having a pore structure uniquely suited for use in applications such as composite tooling.

Recently, a novel sealant comprising two filler fractions having particles of differing size distributions has been developed by UCAR Carbon Company Inc. of Wilmington, Del. and described in above identified U.S. patent application Ser. No. 11/137,111, to which the present application claims priority. The first filler fraction comprises between about 12% to about 50% by weight of the novel sealant material and has a particle size distribution wherein at least 80% of the particles are between about 2 microns and about 500 microns in diameter, with an average diameter of less than about 120 microns. The second filler fraction comprises about 8% to about 35% by weight of the novel sealant material and has an average particle size of between about 0.2 to about 10 microns. The filler particles can be any materials which can be prepared in the desired particle sizes and distributions, including metals and ceramics such as silicon carbide and the filler fractions may be of different materials. The filler particles may be formed of a carbonaceous material in order to more closely match the coefficient of thermal expansion (CTE) of the novel carbon foam.

This novel sealant material can effectively fill the relatively small cells and bimodal cell structure of the novel carbon foam, which has a combination of larger and smaller relatively spherical pores. This novel bimodal pore structure is required if the foam is to be used in applications such as composite tooling. The novel sealant material forms, after curing or low temperature carbonization, a thin layer on a surface of the foam, on the order of about 1000 microns in thickness or less, and is well bonded to the cellular carbon foam surface. Application of this novel sealant effectively converts the carbon foam surface morphology into a monolithic, fine-grain graphite-like surface. The thin layer is well bonded to the carbon foam because the filler particles provide structural stability and also because the filler particles moderate the relatively high coefficient of thermal expansion (CTE) of the resin component so as to provide a sealant coefficient of thermal expansion compatible with the carbon foam coefficient of thermal expansion. The filler particles also help limit the amount of the liquid component in the sealant available to infiltrate into carbon foam. The modified surface morphology of the sealer layer makes it possible to further seal the surface with a typical mold sealer without fillers to provides a vacuum tight surface. The novel sealant applied to the novel carbon foam without use of facesheet materials and the like may be useful for limited composite tooling applications, such as prototyping, where durability of the tooling surface is not of great concern. However, greater tooling surface durability and smoothness is generally required in production applications.

As noted above, cladding of carbon foams has also been suggested in the prior art literature and patents. Joseph and Rogers suggest facesheet materials including Kevlar reinforced carbonaceous foam and laminated E-glass reinforced vinyl esters. Joseph and Rogers also suggest thermal spray applications of coatings of metals to their carbon foam products and further suggest use of aluminum or Inconel nickel-chromium alloy to achieve surface, heat transfer and thermal expansion properties compatible with carbon foam cores. However, it is not known that such a tool has ever been demonstrated.

A preliminary investigation of deposition of sprayed metal upon an open-celled carbon foam surface demonstrated several deficiencies with the prior art applications of thermal or plasma sprayed metal skins. Microscopic examinations of sections of plasma sprayed Invar iron-nickel metal alloy revealed a poorly adhered Invar powder coating that failed to differentially deposit and fill the open cells and pinholes present in the open-celled structure of the carbon foam and, thus, provided a rough pitted surface unsuitable for tooling composite materials.

What is desired therefore, is a composite material tooling article having smooth, durable, tightly adhered skin suitable for use in composite tooling applications; sealants providing a sealed carbon foam surface which enables carbon foams to be employed in high temperature applications such as composite tooling applications; and the carbon foams themselves, especially carbon foams whose pore structure, strength, and strength to density ratio is suitable for use in application such as composite tooling.

SUMMARY OF THE INVENTION

The present invention provides an inventive tooling article that includes a skin of selected facesheet material adhered to a thin layer of a novel carbonaceous sealant, which is itself adhered to a novel bimodal carbon foam, wherein the skin of facesheet material provides a smooth, durable, vacuum-tight tooling surface suitable for composite material tooling applications. The carbon foam is monolithic and has a controllable, bimodal cell structure providing a cell structure, strength and strength to density ratio suitable for composite tooling. The sealant includes two filler fractions having differing particle size distributions. The sealant effectively fills the relatively small cells and bimodal cell structure of the carbon foam and effectively converts the carbon foam surface morphology into a monolithic, fine-grain graphite-like surface. Advantageously, the cured sealant may be sanded, ground or otherwise machined so as to provide, upon application of the facesheet materials, a tooling surface having smoothness suitable for tooling applications. Preferably, the tooling surface meets or exceeds the Root Mean Square (RMS) profile of 63 micro-inches standards.

The thin layer of sealant is well bonded to the carbon foam because the filler particles provide structural stability and also because the filler particles moderate the relatively high coefficient of thermal expansion (CTE) of the resin component so as to provide a coefficient of thermal expansion of the sealant that is compatible with the coefficient of thermal expansion of the carbon foam. The filler particles also help limit the amount of the liquid component in the sealant available to infiltrate into the carbon foam.

Advantageously, the facesheet materials and the sealant are selected such that the facesheet material, the sealant and the bimodal carbon foam all have compatible coefficients of thermal expansion. Optionally, the components of the facesheet material and the components of the sealant are selected such that the facesheet material, the sealant and the bimodal carbon foam have compatible electrical conductivity and heat transfer characteristics.

Preferred embodiments of the inventive article include components of the carbon foam, the skin and/or the sealant which have an uncured precursor state. Such facesheet material components, sealant components and bimodal carbon foam components are stable in their cured state at temperatures up to the temperature of the application for which the embodiments of inventive tooling article are intended. Preferably, the components are stable in their cured state at temperatures up to at least about 300° C., and more preferably are stable in their cured state at temperatures up to at least about 400° C.

The facesheet materials of one preferred embodiment of the inventive tooling article include a metal skin such as an Invar metal skin. Preferably, the facesheet materials include a spray-deposited coating of metal forming a metal skin. More preferably, the facesheet materials include a thermal or plasma spray-deposited coating of metal forming a metal skin. And most preferably, the facesheet materials include a plasma sprayed Invar metal skin.

The inventive tooling article optionally includes flash-coating materials adhered to the surface of the metal skin. Preferably, the flash coating materials include an electrolytic plating adhered to the metal skin. Advantageously, the plating forms a tooling surface having a mirror-like finish. The electrolytic plating is preferably selected from the group including nickel, copper, silver and alloys thereof.

Alternate preferred embodiments of the inventive tooling article include plastic, resinous or carbon-carbon composite facesheet materials adhered to thin layers of the inventive carbonaceous sealants. According to an optional practice of the present invention, a thin layer of the inventive carbonaceous sealant is adhered to the inventive bimodal carbon foam as described above but is not further sealed with a mold sealant. A flexible sheet of plastic, resinous or carbon-carbon composite facesheet materials is then adhered to the sealant layer by means of a vacuum forming process, wherein a vacuum is drawn through the carbon foam and sealant layer. The plastic, resinous or carbon-carbon composite facesheet materials are selected such that the facesheet materials and the bimodal carbon foam have compatible coefficients of thermal expansion, and so as to provide a smooth, durable tooling surface.

Advantageously, the plastic, resinous or carbon-carbon composite facesheet materials of these alternate embodiments of the present invention are stable in their cured state at temperatures higher than the temperature of the application for which the inventive tooling article is intended. Preferably, the plastic, resinous or carbon-carbon composite facesheet materials are stable in their cured state at temperatures up to at least about 300° C., and more preferably are stable in their cured state at temperatures up to at least about 400° C.

The novel sealant of inventive tooling article comprises a resinous sealant having a filler present at a level of between about 20% and about 85% by weight, more preferably about 50% to about 85% by weight, of the sealant material. The filler is comprised of two filler fractions having differing size distributions of the particles. The particles of the first filler fraction preferably have an average diameter at least two times, and more preferably at least four times, that of the particles of the second filler fraction.

The first filler fraction has a particle size distribution wherein at least 80% of the particles are between about 2 microns and about 500 microns, preferably between about 2 microns and about 300 microns, in diameter. The particles of the first filler fraction advantageously have an average diameter of less than about 120 microns, preferably less than about 100 microns. Most preferably, the average diameter of the particles of the first filler fraction is between about 10 microns and about 90 microns. The first filler fraction comprises about 12% to about 50% by weight of the inventive sealant material, more preferably about 34% to about 50% by weight of the sealant.

The second filler fraction comprises particles having an average particle size of between about 0.2 to about 10 microns, more preferably about 0.5 to about 5 microns. In a most preferred embodiment, the second filler fraction comprises particles having an average particle size of about 0.5 to about 2 microns. The second filler fraction comprises about 8% to about 35% of the sealant material, by weight, more preferably about 20% to about 35% of the sealant material.

The materials from which the filler fractions are made may be the same or different for the two fractions. In a particular embodiment, filler particles having aspect ratios up to or even greater than about 10 can be used; preferably, the aspect ratio of the filler particles is less than 10, more preferably less than about 5, and most preferably less than about 2. Indeed, advantageously, the particles are as close to spherical as possible, having an aspect ratio of no greater than about 1.4, in order to provide particles of a relatively low surface area (as compared to particles having a higher aspect ratio) to improve wettability in the sealant solution. The filler particles can be any materials which may be prepared in the desired particle sizes and distributions, including metals and ceramics such as silicon carbide. Most preferably, the filler particles are formed of a carbonaceous material in order to more closely match the coefficient of thermal expansion (CTE) of the foam. The first filler fraction preferably comprises particles of coke, coal and/or graphite, whereas the second filler fraction preferably comprises particles of carbon black.

To form the inventive sealant material, the filler fractions are mixed into a curable material, of low enough viscosity to enable coating of the surface of the foam with the sealant material. Advantageously, the curable material is a resin system, using either a liquid resin, or a solid resin dissolved in a suitable solvent. The resin system is preferably either thermosetting or thermosettable. The resin system, after curing, is stable up to or above the temperatures of the applications for which it is to be employed. In composite tooling applications, the resin system, after curing, is stable up to or above about 300° C., and preferably is stable up to or above about 400° C.

In one embodiment of the invention, the sealant material comprises a filler comprising two fractions as described above, incorporated into a carbonaceous two component thermosetting system which will set at room temperature to provide a rigid sealant with an average strength of at least about 750 psi. This sealant increases substantially in strength after full curing at 150° C. and retains a high strength after baking to 850° C.

The use of the inventive sealant material requires an understanding of the porous nature of carbon foams. The surface pores of carbon foam need to be adequately sealed before applying the facesheet materials. The inventive sealant is, essentially, a high viscosity "rubbing" compound, which can be applied to the surface of the foam with a gentle, rotational motion to work the filler particles of the sealant material into the open surface pores and fill them as completely as possible. The fillers in the pores should substantially block the pores. Low liquid content in the material would limit the extent of penetration. Any excess should be wiped off to allow the best possible surface condition for the foam. After curing, the surface can be further sealed with commercial conventional low-viscosity mold sealers to achieve vacuum tightness, if so desired.

After application of the inventive sealant material, the resulting "sealed" carbon foam has a thin layer of cured sealant (or resin) on the sealed surface thereof. Advantageously, this layer of cured sealant has a thickness of about 1000 microns, preferably about 300 microns or less, more preferably about 200 microns or less. Because of the unique cell structure of the foam, the sealant does not penetrate deeply into the foam structure, which would undesirably increase foam density and make sealing difficult to achieve.

The carbon foam of inventive tooling article has a density of about 0.05 to about 0.8 grams per cubic centimeter (g/cm$^3$), with a compressive strength of at least about 2000 pounds per square inch (psi) (measured by, for instance, ASTM C695). An important characteristic for the carbon foam when intended for use in a high temperature application is its ratio of strength to density. For composite material tooling applications, the carbon foam has a ratio of strength to density of at least about 7000 psi/(g/cm$^3$), and more preferably has a ratio of strength to density of at least about 8000 psi/(g/cm$^3$).

The carbon foam should have a relatively uniform distribution of pores in order to provide the high compressive strength required for composite material tooling applications. In addition, the pores should be relatively isotropic, by which is meant that the pores are relatively spherical, meaning that the pores have, on average, an aspect ratio (that is, the ratio of the longest dimension of the pores to the shortest dimension of the pores) of between about 1.0 (which represents a perfect spherical geometry) and about 1.5.

The foam should have a total porosity of about 50% to about 95%, more preferably about 60% to about 95%. In addition, it has been found highly advantageous to have a bimodal pore distribution, that is, a combination of two average pore sizes, with the primary fraction being the larger size pores and a minor fraction of smaller size pores. Preferably, of the pores, at least about 90% of the pore volume, more preferably at least about 95% of the pore volume should be the larger size fraction, and at least about 1% of the pore volume, more preferably from about 2% to about 10% of the pore volume, should be the smaller size fraction.

The larger pore fraction of the bimodal pore distribution in the carbon foam should be about 10 to about 150 microns in diameter, more preferably about 15 to about 95 microns in diameter, most preferably about 25 to about 95 microns in diameter. The smaller fraction of pores should comprise pores that have a diameter of about 0.8 to about 3.5 microns, more preferably about 1 to about 2 microns. The bimodal nature of the subject carbon foams provide an intermediate structure between open-celled foams and closed-cell foams, thus limiting the liquid permeability of the foam while maintaining a foam structure. Indeed, advantageously, the inventive carbon foams should exhibit a permeability of no greater than about 10.0 darcys, more preferably no greater than about 2.0 darcys (as measured, for instance, by ASTM C577).

Advantageously, to produce the inventive foams, a polymeric foam block, particularly a phenolic foam block, is carbonized in an inert or air-excluded atmosphere, at temperatures which can range from about 500° C., more preferably at least about 800° C., up to about 3200° C. to prepare carbon foams useful in high temperature applications.

An object of the invention, therefore, is to provide a tooling article that includes a skin of selected facesheet material that provides a smooth, durable, vacuum-tight tooling surface, the facesheet material adhered to a layer of a sealant, which is itself adhered to a bimodal carbon foam, which enables the foam to be employed in high temperature applications such as composite tooling applications.

Another object of the invention is to provide a tooling article that includes a skin of selected facesheet material adhered to a layer of a sealant that effectively converts the morphology of a porous carbon foam surface into a monolithic, fine-grain graphite-like surface that may be sanded, ground or otherwise machined so as to provide, upon application of the facesheet materials, a tooling surface having smoothness suitable for tooling applications.

Still another object of the invention is to provide a tooling article wherein the facesheet material, the sealant and the bimodal carbon foam all have compatible coefficients of thermal expansion.

Yet another object of the invention is to provide a tooling article wherein the facesheet material components, the sealant components and the bimodal carbon foam components are stable in their cured state at temperatures up to at least about 300° C., and more preferably are stable in their cured state at temperatures up to at least about 400° C.

Another object of the invention is to provide a tooling article wherein the facesheet material includes a metal skin, preferably a spray-deposited coating of metal forming a metal skin, more preferably, a thermal or plasma spray-deposited coating of metal forming a metal skin, and most preferably, a plasma sprayed Invar metal skin. Other techniques that may be used to deposit a metal skin include mechanical, chemical, electrochemical, or thermal methods, or combinations of these methods.

Another object of the invention is to provide a tooling article wherein the facesheet material includes a flexible sheet of plastic, resinous or carbon-carbon composite facesheet materials is then adhered to the sealant layer by means of a vacuum forming process.

It is to be understood that both the foregoing general description and the following detailed description provide embodiments of the invention and are intended to provide an overview or framework of understanding to nature and character of the invention as it is claimed.

DETAILED DESCRIPTION OF THE PREFERRED EMBODIMENTS

Carbon foams useful in combination with the sealant and facesheet materials in accordance with the present invention are prepared from polymeric foams, such as polyurethane foams or phenolic foams, with phenolic foams being preferred. Phenolic resins are a large family of polymers and oligomers, composed of a wide variety of structures based on the reaction products of phenols with formaldehyde. Phenolic resins are prepared by the reaction of phenol or substituted phenol with an aldehyde, especially formaldehyde, in the presence of an acidic or basic catalyst. Phenolic resin foam is a cured system composed mainly of closed cells. The resins are generally aqueous resoles catalyzed by sodium hydroxide at a formaldehyde:phenol ratio which may vary, but is preferably about 2:1. Free phenol and formaldehyde content of preferred phenolic foams is low, although urea may be used as a formaldehyde scavenger.

Preferred phenolic resin foams are prepared by adjusting the water content of the resin and adding a surfactant (e.g., an ethoxylated nonionic), a blowing agent (e.g., pentane, methylene chloride, or chlorofluorocarbon), and a catalyst (e.g., toluenesulfonic acid or phenolsulfonic acid). The sulfonic acid catalyzes the reaction, while the exothermic reaction causes the blowing agent, emulsified in the resin, to evaporate and expand the foam. The surfactant controls the cell size as well as the ratio of open-to-closed cell units. Both batch and continuous processes are employed. In the continuous process, the machinery is similar to that used for continuous polyurethane foam. The properties of the foam depend mainly on density and the cell structure.

One preferred phenol is resorcinol, however, other phenols of the kind which are able to form condensation products with aldehydes may also be used. Such phenols include monohydric and polyhydric phenols, pyrocatechol, hydroquinone, alkyl substituted phenols, such as, for example, cresols or xylenols; polynuclear monohydric or polyhydric phenols, such as, for example, naphthols, p,p'-dihydroxydiphenyl dimethyl methane or hydroxyanthracenes.

Phenols used to make the phenolic foam starting materials may also be used in admixture with non-phenolic compounds which are able to react with aldehydes in the same way as phenol.

One preferred aldehyde for use in the solution is formaldehyde. Other suitable aldehydes include those which will react with phenols in the same manner. These include, for example, acetaldehyde and benzaldehyde.

In general, the phenols and aldehydes which may be used in the process of the present invention are those described in U.S. Pat. Nos. 3,960,761 and 5,047,225, the disclosures of which are incorporated herein by reference.

Preferably, polymeric foams used as starting materials in the production of novel carbon foams of the present invention have an initial density which mirrors the desired final density for the carbon foam which is to be formed. In other words, the polymeric foams have a density of about 0.1 to about 0.8 g/cc, more preferably about 0.1 to about 0.6 g/cc. The cell structure of such polymeric foams are closed-cell structures having a porosity of between about 65% and about 95% and a compressive strength of at least about 100 p.s.i. and, more preferably, of at least about 300 p.s.i. or higher.

In order to convert the polymeric foam to carbon foam, the polymeric foam is carbonized by heating to a temperature of between about 500° C. and about 3200° C., more preferably between about 800° C. and about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a novel non-graphitizing glassy carbon foam is obtained. An important characteristic for carbon foams used in a high temperature application is their ratio of strength to density. Advantageously, the inventive carbon foams have a relatively uniform distribution of isotropic pores having, on average, an aspect ratio of between about 1.0 and about 1.5. Preferred embodiments of carbon foams of the present invention have a density of about 0.1 to about 0.8 g/cc, and more preferably about 0.1 to about 0.6 g/cc, and have a compressive strength of at least about 2000 pounds per square inch (p.s.i.) (measured by, for instance, ASTM C695). Thus, the preferred embodiments of the novel carbon foam of the present invention achieve a ratio of strength to density of at least about 7000 psi/(g/cm$^3$), more preferably at least about 8000 psi/(g/cm$^3$).

The novel carbon foam has a total porosity of about 50% to about 95%, more preferably about 70% to about 95%. Advantageously, the novel carbon foam has a bimodal pore distribution. According to one preferred embodiment of the present invention, a primary pore fraction has a larger average pore size and a minor pore fraction has a smaller average pore size. Preferably, the primary pore fraction occupies at least about 90% of the pore volume, more preferably at least about 95% of the pore volume, while the minor pore fraction occupies at least about 1% of the pore volume, and more preferably from about 2% to about 10% of the pore volume. The average pore diameter of the primary pore fraction is about 10 to about 150 microns and, more preferably about 15 to about 95 microns, and most preferably about 25 to about 95 microns. The average pore diameter of the primary pore fraction is about 0.8 to about 3.5 microns, and more preferably about 1 to about 2 microns. The bimodal nature of the subject carbon foams provide an intermediate structure between open-celled foams and closed-cell foams, thus limiting the liquid permeability of the foam while maintaining a foam structure. Indeed, advantageously, the inventive carbon foams exhibit a permeability of no greater than about 10.0 darcys, more preferably no greater than about 2.0 darcys (as measured, for instance, by ASTM C577).

Typically, characteristics such as porosity and individual pore size and shape are measured optically, such as by use of an epoxy mount with a microscope using bright field illumination, and are determined using commercially available software, such as Image-Pro Software available from Media-Cybernetic of Silver Springs, Md.

In accordance with the present invention, novel sealant materials useful in combination with the carbon foam and facesheet materials include a resinous sealant having a filler, preferably a carbonaceous filler, present at a level of between about 20% and about 85% by weight, more preferably about 50% to about 85% by weight, of the sealant material. The sealant filler of one embodiment includes two fractions of filler particles having differing size distributions. Preferably, the average diameter of the particles of the first filler fraction is at least two times and, more preferably, at least four times, the average diameter of the particles of the second filler fraction.

Preferably, the first filler fraction has a particle size distribution wherein at least 80% of the particles have diameters of between about 2 microns and about 500 microns and, more preferably, between about 2 microns and about 300 microns. Advantageously, the particles of the first filler fraction have an average diameter of less than about 120 microns, preferably less than about 100 microns. Most preferably, the average diameter of the particles of the first filler fraction is between about 10 microns and about 90 microns. The first filler fraction should comprise about 12% to about 50% by weight of the inventive sealant material, more preferably about 34% to about 50% by weight of the sealant.

Preferably, the particles of the second filler fraction have an average diameter of between about 0.2 to about 10 microns and, more preferably, between about 0.5 to about 5 microns. In a most preferred embodiment, the particles of the second filler fraction have an average diameter of between about 0.5 to about 2 microns. Preferably, the second filler fraction comprises about 8% to about 35% of the sealant material, by weight of the inventive sealant material, and more preferably about 20% to about 35% by weight of the sealant According to the present invention, the two filler fractions may be the same or different materials. Preferably, the filler particles are as close to spherical as possible in order to provide particles of a relatively low surface area (as compared to particles having a higher aspect ratio) to improve wettability in sealant solutions. According to one embodiment, the filler particles have having an average aspect ratio of between about 1.0 and about 10. More preferably, the filler particles have having an average aspect ratio of between about 1.0 and about 1.4. The filler particles can be any materials which can be prepared in the desired particle sizes, shapes and distributions and include metals and ceramics such as silicon carbide. More preferably, the filler particles are formed of carbonaceous materials in order to more closely match the coefficient of thermal expansion (CTE) of the foam. The first filler fraction preferably includes particles of carbon and/or graphite, especially coke or graphite powder (or flour). The second filler fraction preferably includes carbon black. One suitable carbon black that can be used is available under the tradename THERMAX from Cancarb Company of Medicine Hat, Alberta, Canada.

The carbonaceous sealant material for the present invention may be provided as a two- or three-component system. According to preferred embodiments of the present invention, novel carbonaceous sealant materials include two-component systems having a solid component and a liquid component wherein the solid component preferably includes a mixture of a solid phenolic resin, two carbonaceous filler fractions as described above and a solid catalyst. The solid acid catalyst is selected from the group consisting of p-toluene sulfonic acid, benzene sulfonic acid, tri-chloroacetic acid, naphthalene disulfonic acid, benzene disulfonic acid, tri-fluoroacetic acid, sulfuric acid, and methanesulfonic acid.

The solid phenolic resin may be optionally omitted from the solid component, however the sealant strength may be reduced as a result.

According to preferred embodiments of the present invention, the liquid component includes a solution of a phenolic resin in furfuraldehyde. The preferred phenolic resin is of the resol type, although any conventional phenolic resin may be employed in either the solid or liquid component of the carbonaceous sealant material of the present invention. However, to avoid neutralizing the acid catalyst of the resin, the phenolic resin should not have significant amounts of any amine or basic catalyst component. The acid catalyst catalyzes the polymerization and carbonization of the furfuraldehyde liquid. The liquid containing the dissolved phenolic resin will give a bake carbon yield of at least 40% when treated with the catalyst of the solid component. The phenolic resin may be optionally omitted from the liquid component and still permit room temperature setting by catalysis of furfural. However, as a result, the liquid carbon yield will be reduced by about one half and the cured and bake strength will also be reduced.

In another preferred embodiment, the sealant is composed of a two-component system consisting of a liquid portion and a solid portion where the solid portion includes a novolac phenolic resin and a catalyst. The catalyst preferably includes a hexamethylene tetramine which is present at an amount equal to from 4% to 12% by weight of the novolac resin. The remaining components of the solid portion are carbonaceous solids as described above. The liquid portion includes a thermosettable furan, such as furfuryl alcohol, which serves as a solvent for the novolac and is partially thermoset by the hexamethylene tetramine catalyst. Other basic catalysts, such as triethylenetriamine and ethylene diamine, may be added to assist in curing the furfuryl alcohol. However, to avoid neutralizing the hexamethylene tetramine catalyst needed to cure the novolac, the catalysts should not have significant amounts of any acid catalyst component.

In still other preferred embodiments of the present invention, the sealant materials are formulated as three component systems including a solid component and liquid component as above described for the two component systems and a separate third component providing an acid catalyst in the form of a fluid solution in water or alcohol.

The minimum concentration of catalyst to achieve a room temperature setting depends upon the selection of the catalyst. In preferred embodiments wherein p-toluene sulfonic acid is used as the acid catalyst, a room temperature setting can be achieved in less than twenty four hours with as little as about 2.0 weight percent acid catalyst based upon the weight of the sealant material.

Iron or steel powder is included in the solid portion of the sealant material of alternate preferred embodiments of the inventive sealant materials to provide for sealant materials having an increased electrical conductivity. Suitable amounts of iron or steel particles are from 10% to 40% by weight of sealant material, and preferably from 20% to 30% by weight of sealant material. A larger amount of p-toluenesulfonic acid is required for room temperature setting when iron or steel particles are present. In such an alternate preferred embodiment wherein the catalyst is p-toluenesulfonic acid, the weight of catalyst required is about twice that used for a sealant materials prepared without the addition of iron.

In yet other preferred embodiments of the present invention, the sealant materials include the noted filler fractions and a high temperature thermosetting polymeric resin which, in its cured state, is thermally stable up to 500° C.; a thermosettable furan selected from the group consisting of furfural, and furfuryl alcohol; and a heat-activated catalyst for the thermosettable furan.

As described, the resin in the sealant materials of the present invention includes resins which are stable in their cured state at temperatures up to the temperature of the application for which the foam is intended. Preferably, the resins of the sealant material are stable in their cured state at temperatures up to at least about 500° C. Preferred high-temperature resins, before curing, are generally soluble in a solvent and form a relatively homogeneous liquid allowing the combining of the high-temperature resin with the other components to form the sealant material.

Suitable high-temperature resins include, for example, polyimides, polybenzimidazoles, bismaleimides, polyarylketones, and polyphenylene sulfides, and a polymerizable monomeric system consisting of an aromatic tetracarboxylic acid, an aromatic diamine and a monoalkyl ester. Preferred high-temperature resins include fluorinated polyimides and the polymerizable monomeric system set out above. In preferred embodiments of the present invention, the novel sealant materials include an amount of high-temperature resin from about 5% to about 30% by weight of sealant material and, preferably, from about 10% to about 20% by weight of sealant material.

The liquid thermosettable furan includes furfural or furfuryl alcohol and is present in the sealant materials at a level of from about 20% to about 45% by weight of the sealant materials, preferably from about 30% to about 40% by weight of the sealant materials. The thermosettable furan is preferably a liquid to facilitate formation of the sealant material. In addition, the thermosettable furan preferably acts as a solvent for the high-temperature resin to further assist in formation of the inventive sealant materials. Furfuryl alcohol is a more preferred thermosettable furan because of the high solubility of the high temperature resins and its known compatibility with carbon and graphite.

The filler-containing sealant of this embodiment of the present invention also contains a heat activated catalyst to catalyze the thermosettable furan when the sealant is heated. When the furan component is furfuryl alcohol, then most suitable catalysts are weakly acidic catalysts, such as zinc chloride, maleic acid, citric acid, tartaric acid, phthalic anhydride and zinc nitrate. Strong acids such as sulfuric acid, and hydrochloric acid can also be used but care must be taken to avoid highly exothermic reaction.

The sealant materials of such embodiments of the invention are produced by mixing individual components together by any suitable method using known equipment for mixing like materials. The order in which the components are mixed is not critical, except the heat-activated catalyst for the thermosettable furan should preferably be added last, either by mixing all the components and lastly adding the catalyst, or by separately forming a catalyst-activated thermosettable furan mixture of the catalyst and the furan, and adding this mixture to a premixture of the other components of the sealant material.

A catalyst-activated, heat-curable furan can be prepared by admixing at ambient temperature a major proportion of, for example, furfuryl alcohol and a minor proportion of the heat activated catalyst and water. Typically an aqueous zinc chloride solution catalyst (50% by weight $ZnCl_2$) is used in an amount of about 2% to about 10% by weight catalyst solution, based upon the weight of the furfuryl alcohol.

According to the practice of the present invention, the surface pores of the novel carbon foam must be adequately sealed with the inventive sealant before applying a thermal or plasma sprayed metal skin or other facesheet materials. Otherwise, as discussed above, the thermal or plasma spray application of a metal skin will produce a rough pitted surface unsuitable for tooling composite materials. Similarly, non-metal facesheet materials applied directly to the carbon foam exhibit inherent structural problems producing surfaces unsuitable for tooling.

As used in preferred embodiments of the invention, the inventive sealant is similar to a high viscosity "rubbing" compound, in that it is applied to the surface of the bimodal carbon foam with a gentle, rotational motion to work the filler particles of the sealant material into the open surface pores and fill them as completely as possible. Other methods of application of the inventive sealant would be obvious to those skilled in the arts. In preferred embodiments, the fillers substantially block the pores of the carbon foam while the low liquid content of the inventive sealant materials limit the extent of penetration of the sealant into the carbon foam. Preferably, excess sealant is removed wiped off to allow the best possible surface condition for the foam.

The applied sealant is then cured as described above or is carbonized by baking at temperatures up to about 850° C. After curing or low temperature carbonization, the inventive sealant material forms a thin layer on the surface of the bimodal carbon foam. The sealant layer has a thickness of no more than about 1000 microns and is well bonded to the cellular carbon foam surface. This layer of sealant effectively converts the carbon foam surface morphology into a monolithic fine-grain graphite like surface. The thin layer is well bonded to the carbon foam because the filler particles provide structural stability and also because the filler particles moderate the relatively high coefficient of thermal expansion (CTE) of the resin component such that the sealant and the bimodal carbon foam have compatible coefficients of thermal expansion. The filler particles also help limit the amount of the liquid component in the sealant available to infiltrate into carbon foam. The modified surface morphology with the sealer layer makes it possible to further seal the surface with a typical mold sealer so as to form a relatively vacuum tight surface on the carbon foam where desired. The sealed surface of the bimodal carbon foam is preferably sanded, polished or otherwise machined to obtain a desired smoothness before a facesheet material is applied.

According to the practice of the present invention, an inventive article suitable for tooling composite materials is formed by applying a skin of selected facesheet material to the sealed surface of the bimodal carbon foam. The inventive tooling article of the present invention includes a skin of selected facesheet material adhered to a thin layer of the inventive carbonaceous sealant, the sealant adhered to the inventive bimodal carbon foam, wherein the components of the facesheet material and the components of the sealant are selected such that the facesheet material, the sealant and the bimodal carbon foam have compatible coefficients of thermal expansion, and wherein the skin of facesheet material provides a smooth, durable tooling surface. Optionally, the components of the facesheet material and the components of the sealant are selected such that the facesheet material, the sealant and the bimodal carbon foam have compatible electrical conductivity and heat transfer characteristics.

The components of the embodiments of the present invention are stable in their cured state at temperatures up to the temperature of the application for which the embodiments of inventive tooling article are intended. Preferably, the components are stable in their cured state at temperatures up to at least about 300° C., and more preferably are stable in their cured state at temperatures up to at least about 400° C.

The facesheet materials of one preferred embodiment of the inventive tooling article include a metal skin such as an Invar metal skin. Preferably, the facesheet materials include a spray-deposited coating of metal forming a metal skin. More preferably, the facesheet materials include a thermal or plasma spray-deposited coating of metal forming a metal skin. And most preferably, the facesheet materials include a plasma sprayed Invar metal skin.

According to an optional embodiment of the present invention, the inventive tooling article further includes flash-coating materials adhered to the surface of the facesheet materials. Preferably, the flash coating materials include an electrolytic plating adhered to the metal skin, the plating forming a tooling surface having a mirror-like finish. The electrolytic plating is preferably selected from the group nickel, chromium, iron and alloys thereof.

Alternate preferred embodiments of the inventive tooling article include plastic, resinous or carbon-carbon composite facesheet materials adhered to thin layers of the inventive carbonaceous sealants. According to an optional practice of the present invention, a thin layer of the inventive carbonaceous sealant is adhered to the inventive bimodal carbon foam as described above but is not further sealed with a mold sealant. A flexible sheet of plastic, resinous or carbon-carbon composite facesheet materials is then adhered to the sealant layer by means of a vacuum forming process, wherein a vacuum is drawn through the carbon foam and sealant layer. The plastic, resinous or carbon-carbon composite facesheet materials are selected such that the facesheet materials and the bimodal carbon foam have compatible coefficients of thermal expansion, and so as to provide a smooth, durable tooling surface. The plastic, resinous or carbon-carbon composite facesheet materials of these alternate embodiments of the present invention are stable in their cured state at temperatures up to the temperature of the application for which the inventive tooling article is intended. Preferably, the plastic, resinous or carbon-carbon composite facesheet materials are stable in their cured state at temperatures up to at least about 300° C., and more preferably are stable in their cured state at temperatures up to at least about 400° C.

The disclosures of all cited patents and publications referred to in this application are incorporated herein by reference in their entirety.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. An article for tooling composite materials, the article comprising:
   a carbon foam having a pore distribution such that at least about 90% of the pore volume comprises pores having a diameter of between about 10 microns and about 150 microns and at least about 1% of the pore volume comprises pores having a diameter of between about 0.8 microns and about 3.5 microns;
   a sealant attached to the carbon foam; and
   a skin attached to the sealant, the skin having a tooling surface, wherein the sealant comprises a filler having of two sets of filler particles including a first filler fraction and a second filler fraction, the filler fractions having differing particle size distributions.

2. The article of claim 1, wherein the skin comprises a metal.

3. The article of claim 2, wherein the metal skin comprises a plasma spray deposited coating of an iron-nickel metal alloy.

4. The article of claim 1, wherein the average diameter of the particles of the first filler fraction is at least twice the average diameter of the particles of the second filler fraction.

5. The sealant of claim 1, wherein the particles of the first filler fraction have an average diameter of less than about 120 microns.

6. The article of claim 1, wherein the particles of the second filler fraction have an average diameter of between about 0.2 to about 10 microns.

7. The article of claim 1, wherein the first filler fraction comprises between about 12% to about 50% of the sealant by weight.

8. The article of claim 1, wherein the second filler fraction comprises about 8% to about 35% of the sealant by weight.

9. The article of claim 1, wherein at least 80% of the particles of the first filler fraction are between about 2 microns and about 500 microns in diameter.

10. The article of claim 1, wherein the first filler fraction and the second filler fraction each comprise carbonaceous particles.

11. The article of claim 10, wherein the first filler fraction comprises particles of coke, coal or graphite and the second filler fraction comprises particles of carbon black.

\* \* \* \* \*